US009617926B2

(12) United States Patent
Takahashi (10) Patent No.: US 9,617,926 B2
(45) Date of Patent: Apr. 11, 2017

(54) DEVICE AND METHOD FOR CONTROLLING INTERNAL COMBUSTION ENGINE FOR VEHICLE (71) Applicant: NISSAN MOTOR CO., LTD., Yokohama-shi, Kanagawa (JP)

(72) Inventor: Eiji Takahashi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/106,499

(22) PCT Filed: Aug. 6, 2014

(86) PCT No.: PCT/JP2014/070718
§ 371 (c)(1),
(2) Date: Jun. 20, 2016

(87) PCT Pub. No.: WO2015/098170
PCT Pub. Date: Jul. 2, 2015

(65) Prior Publication Data
US 2016/0333804 A1 Nov. 17, 2016

(30) Foreign Application Priority Data
Dec. 25, 2013 (JP) .................. 2013-266245

(51) Int. Cl.
F02D 15/00 (2006.01)
F02D 41/02 (2006.01)
(Continued)

(52) U.S. Cl.
CPC ............ F02D 15/02 (2013.01); B60W 10/11 (2013.01); F02D 11/02 (2013.01); F02D 15/00 (2013.01);
(Continued)

(58) Field of Classification Search
CPC .......... F02D 15/00; F02D 15/02; F02D 15/04; F02D 11/02; F02D 2700/03;
(Continued)

(56) References Cited

U.S. PATENT DOCUMENTS

| 6,561,145 B1 * | 5/2003 | Stockhausen ............. F01L 9/02 123/198 F |
| 2004/0069254 A1 | 4/2004 | Aoyama et al. |
| 2004/0153234 A1 * | 8/2004 | Mogi ..................... B60K 6/445 701/103 |

FOREIGN PATENT DOCUMENTS

| JP | 2004-092639 A | 3/2004 |
| JP | 2005-147104 A | 6/2005 |

(Continued)

Primary Examiner — Stephen K Cronin
Assistant Examiner — George Jin
(74) Attorney, Agent, or Firm — Foley & Lardner LLP (57) ABSTRACT In a vehicle with an automatic transmission, an internal combustion engine is provided with a variable compression ratio mechanism. A target compression ratio of the variable compression ratio mechanism is determined based on a demand load and an engine rotation speed with reference to a compression ratio map. A reverse-drive compression ratio map is selected when the automatic transmission is in a reverse drive position; a first compression ratio map is selected when an actual speed reduction ratio of the transmission is low; and a second compression ratio map is selected when the actual speed reduction ratio of the transmission is high. A variable control range of the compression ratio is narrower in the second compression ratio map than in the first compression ratio map and is narrower in the reverse-drive compression ratio map than in the first and second compression ratio maps.

5 Claims, 5 Drawing Sheets (51) Int. Cl.
  *F02D 15/02*   (2006.01)
  *F02D 41/24*   (2006.01)
  *F02D 11/02*   (2006.01)
  *B60W 10/11*   (2012.01)
  *B60W 10/06*   (2006.01)

(52) U.S. Cl.
  CPC ....... *F02D 41/023* (2013.01); *F02D 41/0225* (2013.01); *F02D 41/2422* (2013.01); *B60W 10/06* (2013.01)

(58) Field of Classification Search
  CPC ........... F02D 2700/035; F02D 41/2422; F02D 41/0225; F02D 41/023; F02D 41/10; F02D 41/02; F02D 41/0215; F02B 75/045; F02B 75/048; F02P 5/1504; B60W 20/10; B60W 2700/0666; B60W 2710/083; F16H 59/40; F16H 63/502; B60K 6/543; B60K 17/00
  USPC ..................................... 477/54, 90, 107, 115
  See application file for complete search history.

(56) References Cited

FOREIGN PATENT DOCUMENTS

| | | |
|---|---|---|
| JP | 2010-132085 A | 6/2010 |
| JP | 2010-270714 A | 12/2010 |
| JP | 2011-144784 A | 7/2011 |

* cited by examiner

DEVICE AND METHOD FOR CONTROLLING INTERNAL COMBUSTION ENGINE FOR VEHICLE

FIELD OF THE INVENTION

The present invention relates to a device and method for controlling an internal combustion engine for a vehicle with a transmission mechanism and, more particularly, to compression ratio control of the internal combustion engine having a variable compression ratio mechanism that changes a mechanical compression ratio.

BACKGROUND ART

Various types of variable compression ratio mechanisms are conventionally known, which change mechanical compression ratios of internal combustion engines. For example, the present applicant has proposed many variable compression ratio mechanisms of the type capable of moving up and down the top dead center position of a piston by changing the link geometry of a multi-link type piston-crank mechanism. There are also known variable compression ratio mechanisms of the type capable of changing a mechanical compression ratio by moving up and down the position of a cylinder relative to the center position of a crank shaft.

It is basically preferable for the variable compression ratio mechanism to set the compression ratio as high as possible within the range that does not cause abnormal combustion such as knocking. Thus, the target compression ratio generally tends to become higher as the load decreases. For instance, Patent Document 1 discloses a technique for operating a variable compression ratio mechanism so as to control a compression ratio with reference to a compression ratio map in which the optimal target compression ratio has previously been defined using a load and rotation speed (rpm) of an internal Combustion engine as parameters. In one example of this technique, the mechanical compression ratio is continuously varied and controlled within the range of 10 to 16.

Patent Document 2 discloses a technique for controlling a vehicle internal combustion engine with a variable compression ratio mechanism so as to change a compression ratio in a direction that reduces a shock caused by inertia torque during speed change operation of a transmission.

Patent Document 1 does not specifically mention the relationship between the speed reduction ratio of the transmission and the control of the compression ratio. However, the technique of Patent Document 1 presents a problem of deterioration in drivability caused by a large change of the compression ratio in response to driver's accelerator pedal operation (equivalently, demand load) when the vehicle is driven with fine adjustment of vehicle speed in a high speed reduction ratio state. In particular, the variable compression ratio mechanism using mechanical workings unavoidably causes a delay in operation response so that changes of the actual compression ratio are delayed relative to quick changes of the demand load. This leads to the occurrence of a torque change at driver's unintended timing, which can result in drivability deterioration.

Patent Document 2 does not give any solution to the above drivability problem based on the speed reduction ratio of the transmission.

PRIOR ART DOCUMENTS

Patent Document

Patent Document 1: Japanese Laid-Open Patent Publication No. 2004-92639

Patent Document 2: Japanese Laid-Open Patent Publication No. 2011-144784

SUMMARY OF THE INVENTION

The present invention provides a control device for controlling an internal combustion engine for a vehicle, the internal combustion engine having a variable compression ratio mechanism to change a mechanical compression ratio, the vehicle having a transmission mechanism disposed between the internal combustion engine and driving wheels to change a speed reduction ratio, the control device being adapted to set the mechanical compression ratio based on engine operating conditions, wherein the control device varies a control range of the mechanical compression ratio according to the speed reduction ratio.

Namely, the present invention is characterized in that, while the mechanical compression ratio of the variable compression ratio mechanism is set based on the engine operating conditions such as engine load and rotation speed (rpm), the control range of the mechanical compression ratio (that is, the width of change between lower and upper limit values of the mechanical compression ratio) is varied according to the speed reduction ratio.

In a preferred aspect of the present invention, the control range of the mechanical compression ratio is limited to a narrower range as the speed reduction ratio is higher; and the control range of the mechanical compression range is limited to a narrower range during reverse driving than during forward driving.

Drivability deterioration is suppressed by setting the control range of the mechanical compression ratio according to the speed reduction ratio as mentioned above.

It is accordingly possible in the present invention to suppress a torque change occurring at driver's unintended timing and thereby obtain improvement in drivability as the control range of the mechanical compression ratio is variable set according to the speed reduction ratio of the transmission mechanism.

DESCRIPTION OF EMBODIMENTS

Figure 1:
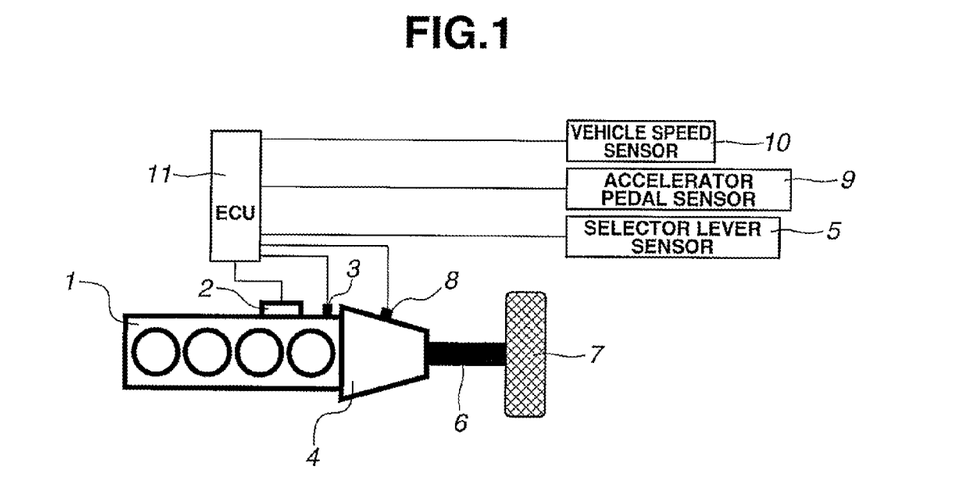
FIG. 1 is a schematic configuration diagram of a vehicle system with a control device according to one embodiment of the present invention.

FIG. 1 is a schematic configuration diagram of a vehicle system with an internal combustion engine 1 and a control device according to one embodiment of the present invention.

The internal combustion engine 1 has a known compression ratio mechanism (not designated in the figure) that moves up and down the top dead center position of a piston by changing the link geometry of a multi-link type piston-crank mechanism. The compression ratio mechanism is equipped with a variable compression ratio actuator 2 such as electric motor to change the link geometry, that is, to change a mechanical compression ratio (hereinafter also simply referred to as "compression ratio"). An automatic transmission 4 using a belt type continuously variable transmission mechanism is connected to the internal combustion engine 1. A drive shaft 6 is driven by an output shaft of the transmission 4 via a differential gear so as to drive driving wheels 7.

The automatic transmission 4 has a plurality of drive ranges including a forward drive range (D range) for forward driving, a reverse drive range (R range) for reverse driving and a neutral range (N range). Either one of the drive ranges is selected depending on the position of a selector lever (not shown) operated by a driver. A selector lever sensor 5 is provided to the selector lever so as to detect the drive range (i.e. selector position PS) selected by the driver. A speed reduction ratio sensor 8 is provided to the transmission 4 so as to detect the actual speed reduction ratio RR of the continuously variable transmission mechanism of the transmission 4. The transmission 4 may alternatively be configured as an automatic transmission that performs speed change operation by gear changes.

There are provided an accelerator pedal sensor 9 for detecting the opening of an accelerator pedal (i.e. demand load tT) operated by the driver and an engine rotation speed sensor 3 for detecting the rotation speed (rpm) Ne of the internal combustion engine, such that these parameters are detected as operating conditions of the internal combustion engine 1. There is provided a vehicle speed sensor 10 for detecting the running speed of the vehicle, i.e., vehicle speed VS. Other various sensors are also provided, including an air flow meter for detecting the amount of intake air in an intake passage of the internal combustion engine, a coolant temperature sensor for detecting the temperature of coolant in the internal combustion engine and an air-fuel ratio sensor for detecting the air-fuel ratio of exhaust gas at an upstream side of an exhaust purification catalyst in an exhaust passage of the internal combustion engine, although not specifically relevant to the present invention and thereby not shown in the figures. The detection signals of the sensors are inputted into a control unit 11. Based on the sensor detection signals, the variable compression ratio actuator 2 is driven so as to control the mechanical compression ratio to its target value. Similarly, the automatic transmission 4 is operated so as to control the speed reduction ratio to its target value according to the driver's demand and vehicle operating conditions.

Figure 2:
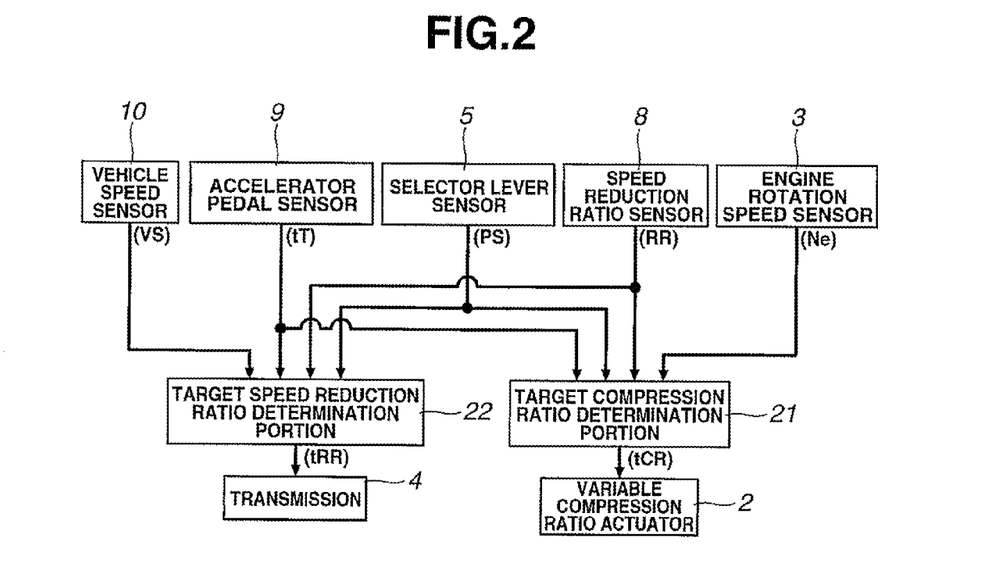
FIG. 2 is a block diagram for compression ratio control and speed reduction ratio control executed by the control device according to the one embodiment of the present invention.

FIG. 2 is a block diagram for compression ratio control and speed reduction ratio control executed by the control unit 11. In the control unit, a target compression ratio determination portion 21 is provided with a plurality of predetermined compression ratio maps as will be explained later and adapted to select either one of the compression ratio maps depending on the selector position PR detected by the selector lever sensor 5 and the actual speed reduction ratio RR detected by the speed reduction ratio sensor 8, determine the target value of the mechanical compression ratio, i.e., target compression ratio tCR based on the demand load tT detected by the accelerator pedal sensor 9 and the engine rotation speed Ne detected by the engine rotation speed sensor 3 with reference to the selected compression ratio map, and then, drive the variable compression ratio actuator 2 according to the target compression ratio tCR. Further, a target speed reduction ratio determination portion 22 is adapted to determine the target speed reduction ratio tRR of the automatic transmission 4 based on the vehicle speed VS detected by the vehicle speed sensor 10, the demand load tT detected by the accelerator pedal sensor 9, the selector lever position PS and the actual speed reduction rate RR detected by the speed reduction ratio sensor 8, and then, control the automatic transmission 4 according to the target speed reduction ratio tRR.

Figure 3:
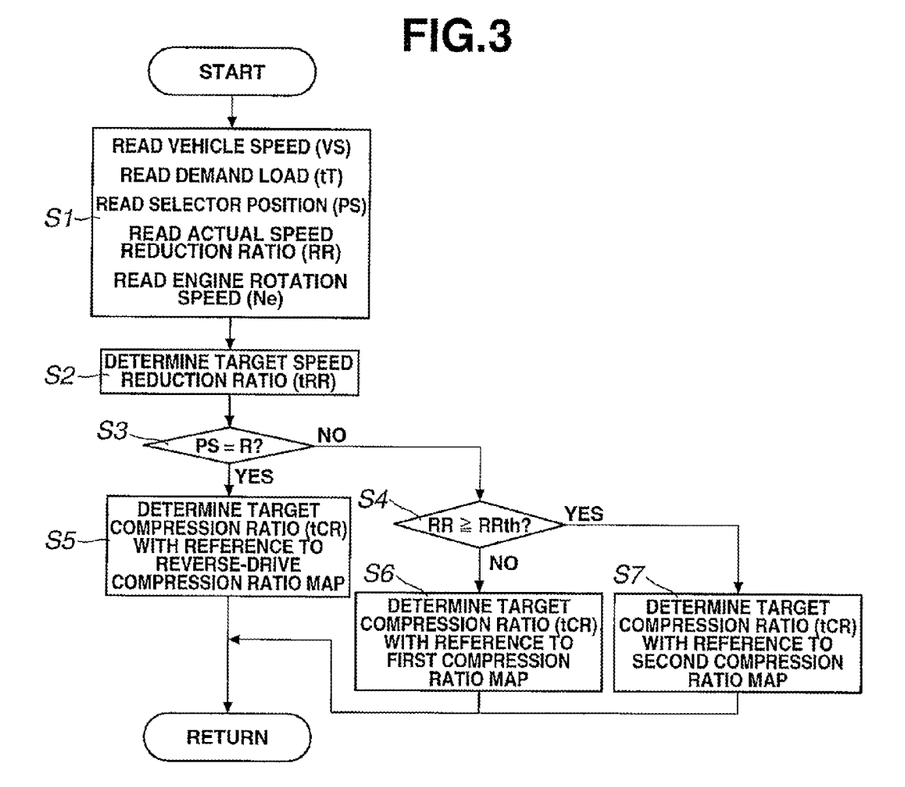
FIG. 3 is a flowchart for control processing executed by the control device according to the one embodiment of the present invention.

FIG. 3 is a flowchart for compression ratio control and speed reduction ratio control executed by the engine control unit 11. At step 1, the vehicle speed VS, the demand load tT, the selector position PS, the actual speed reduction ratio RR and the engine rotation speed Ne are read.

At step 2, the target speed reduction ratio tRR is determined based on the vehicle speed VS, the demand load tT, the selector position PS and the actual speed reduction ratio RR.

At step 3, it is judged whether the selector position PS is the reverse drive position (R range). When the selector position is the reverse drive position, the control proceeds to step 5. At step 5, the target compression ratio tT is determined upon selection of a predetermined reverse-drive compression ratio map as the compression ratio setting map. More specifically, the target compression ratio tCR is determined according to the demand load tT and the engine rotation speed Ne with reference to the reverse-drive compression ratio map.

When the selector position is not the reverse drive position, the control proceeds to step 4. At step 4, it is judged whether the actual speed reduction ratio RR is higher than or equal to a predetermined threshold value RRth. When the actual speed reduction ratio RR is lower than the threshold value RRth, the control proceeds to step 6. At step 6, a predetermined first compression ratio map is selected as the compression ratio setting map, and then, the target compression ratio tCR is determined according to the demand load tT and the engine rotation speed Ne with reference to the first compression ratio map. When the actual speed reduction ratio RR is higher than or equal to the threshold value RRth, the control proceeds to step 7. At step 7, a predetermined second compression ratio map is selected as the compression ratio setting map, and then, the target compression ratio tCR is determined according to the demand load tT and the engine rotation speed Ne with reference to the second compression ratio map.

Figure 4:
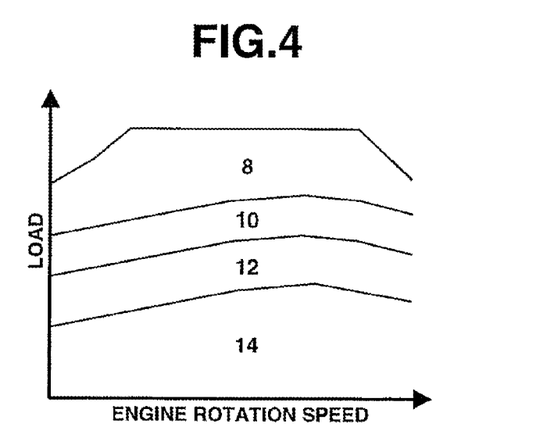
FIG. 4 is a characteristic diagram of a first compression ratio map used by the control device in a low speed reduction ratio state according to the one embodiment of the present invention.
Figure 5:
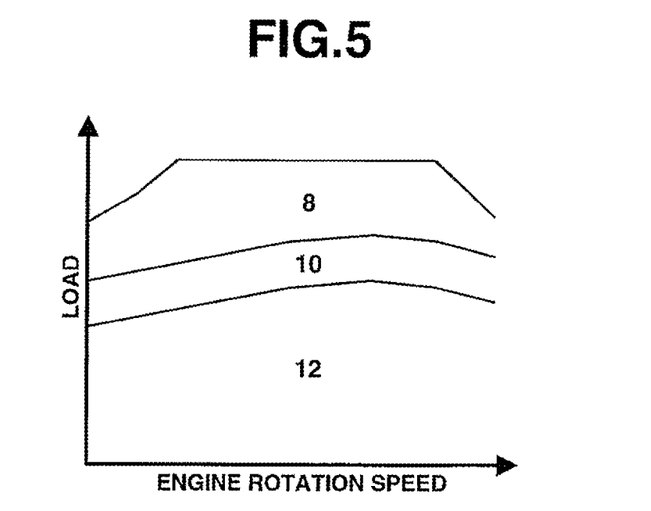
FIG. 5 is a characteristic diagram of a second compression ratio map used by the control device in a high speed reduction ratio state according to the one embodiment of the present invention.

In the first and second compression ratio maps, the optimal value of the mechanical compression ratio is defined using the demand load and the engine rotation speed as parameters. FIG. 4 is a characteristic diagram of the first compression ratio map used in step 6. FIG. 5 is a characteristic diagram of the second compression ratio map used in step 7. As shown in the figures, each of the first and second compression ratio maps has a tendency to set a high compression ratio on a low load side and set a lower compression ratio as the load becomes higher. The first compression ratio map is selected when the actual speed reduction ratio RR is low. In the first compression ratio map, the compression ratio is changed within the range from a maximum-load-region compression ratio value of 8 to a low-load-region compression ratio value of 14. The second compression ratio map is selected when the actual speed reduction ratio RR is high. In the second compression ratio map, the compression ratio is set to a maximum compression ratio value of 12 in a low load region and is changed within the range from a maximum-load-region compression ratio value of 8 to a low-load-region compression ratio value of 12.

Namely, the width of change of the compression ratio, i.e., the variable control range of the compression ratio is set to the range of "8 to 14" in the first compression ratio map for the low actual speed reduction ratio RR. On the other hand, the variable control range of the compression ratio is limited to the relatively narrow range of "8 to 12" in the second compression ratio map for the high actual speed reduction ratio RR. In particular, the region of the compression ratio of 12 is made wider in the second compression ratio map than in the first compression ratio map such that, when the actual speed reduction ratio RR is low, the lower-load-side compression ratio of 14 is limited to the compression ratio of 12 in the present embodiment. It is herein noted that the present invention is not limited to such an embodiment. The compression ratio map may be provided with different control characteristics including the regions of the lower compression ratios of 8 and 10.

Figure 6:
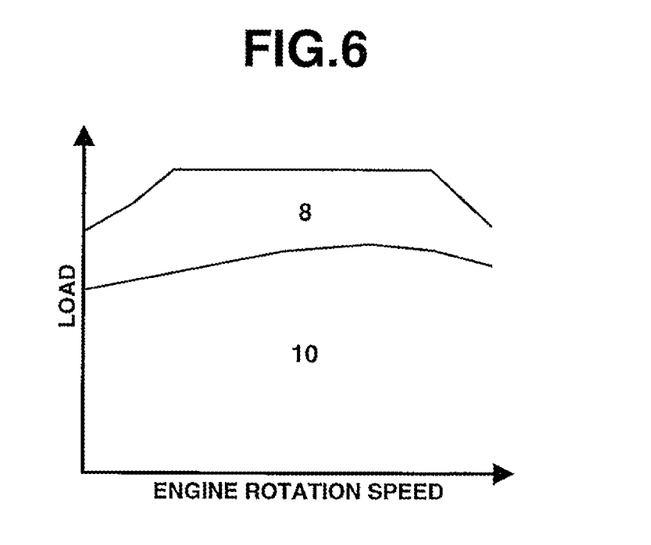
FIG. 6 is a characteristic diagram of a reverse-drive compression ratio map used by the control device at the selection of a reverse drive position according to the one embodiment of the present invention.

FIG. 6 is a characteristic diagram of the reverse-drive compression ratio map used during reverse driving, i.e., selection of the reverse drive position (R range) as the selector position PS. In the reverse-drive compression ratio map, the optimal value of the mechanical compression ratio is also defined using the demand load and the engine rotation speed as parameters. The reverse-drive compression ratio map has a tendency to set a high compression ratio on a low load side and set a lower compression ratio as the load becomes higher. In the reverse-drive compression ratio map, the compression ratio is set to a maximum compression ratio value of 10 in a low load region and is limited to within the variable control range from a maximum-load-region compression ratio value of 8 to a low-load-region compression ratio value of 10. Namely, the variable control range of the compression ratio is made narrower in the reverse-drive compression ratio map than in the respective first and second compression ratio maps. In particular, the region of the compression ratio of 10 is made wider in the reverse-drive compression ratio map than in the first compression ratio map such that, when the actual speed reduction ratio RR is low, the lower-load-side compression ratios of 14 and 12 are limited to the compression ratio of 10 in the present embodiment. It is herein noted that the present invention is not limited to such an embodiment. The compression ratio map may be provided with different control characteristics including the region of the lower compression ratio of 8.

It is possible to improve the operability of the vehicle by limiting the variable control range of the compression ratio to the relatively narrow range when the actual compression ratio RR is high and when the vehicle is driven in reverse. For example, when the vehicle is driven with fine adjustment of vehicle speed in a low vehicle speed state, there occur frequent changes between the compression ratio of 14 and the compression ratio of 12 in the case of using the first compression ratio map at all times. This leads to deterioration in drivability. By contrast, there do not occur such unrequired compression ratio changes in the case of using the second compression ratio map in which the region of the compression ratio of 12 is widened to the low load region. During selection of the reverse drive position that is often used for so-called garage parking etc., the control range of the compression ratio is further limited in which the region of the compression ratio of 10 is widened. Thus, an unintended torque change is suppressed from occurring due to changes of the compression ratio.

Figure 7:
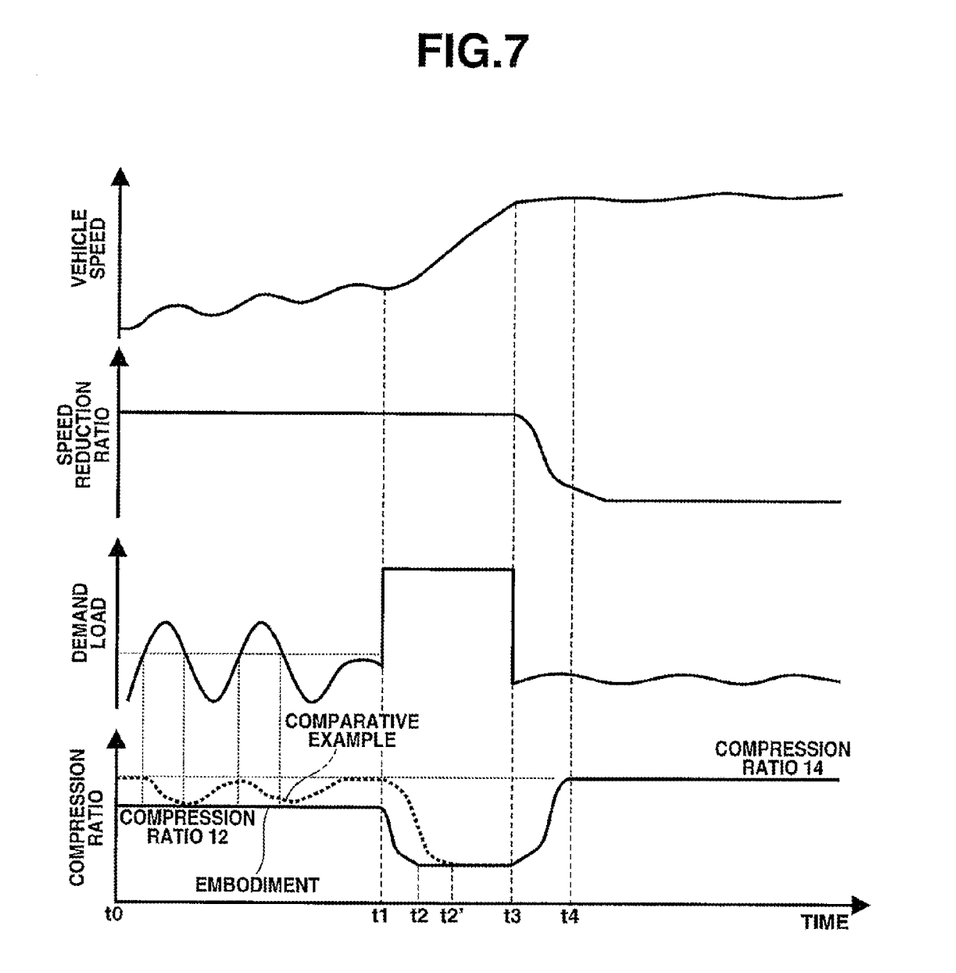
FIG. 7 is a timing chart showing changes in operating conditions according to the one embodiment of the present invention during acceleration from a low vehicle speed state.

FIG. 7 is a timing chart showing, by way of example, changes of the compression ratio and the other operating conditions during acceleration from a low vehicle speed state.

In this example, the period from time t0 to time t1 corresponds to a status where the vehicle is gradually accelerated with fine adjustment of the vehicle speed by the driver in a low vehicle speed region. The speed reduction rate is set to a high value as the vehicle speed is low. During this period, the demand load (that is, the amount of depression of the accelerator pedal) is repeatedly increased and decreased in a relatively low load region for adjustment of the vehicle speed. Since the actual speed reduction ratio RR is high, the target compression ratio tCR is set with reference to the second compression ratio map of FIG. 5 in the present embodiment. As a result, the compression ratio is maintained substantially constant at around 12.

The period from time t1 to time t2 corresponds to a status where the vehicle is accelerated with depression of the accelerator pedal by the driver. During this period, the compression ratio is decreased as the demand load tT is stepwisely increased. In this example, the compression ratio is decreased to "8" based on the second compression ratio map.

At time t3, the acceleration is finished. As the demand load tT is decreased, the vehicle is shifted to a steady running state of constant vehicle speed. During the period from time t3 to time t4, the compression ratio is increased with decrease in the demand load tT. Simultaneously, the speed reduction ratio is decreased with decrease in the demand load. The compression ratio setting map is then switched from the second compression ratio map to the first compression ratio map. As a result, the compression ratio is increased to "14" in accordance with the low demand load tT.

The dotted line in the figure indicates, as a comparative example, a change of the compression ratio in the case of using the first compression ratio map in which the control range of the compression ratio is "8 to 14" irrespective of the actual speed reduction ratio RR. In this case, the operating condition is repeatedly changed between the compression ratio of 12 and the compression ratio of 14 in the first compression ratio map in response to quick changes of the demand load tT during the period from time t0 to time t1. There thus occur repeated relatively large changes of the compression ratio. In addition, the actual compression ratio responds with delay to the changes of the demand load tT due to an unavoidable response delay of the mechanically-working variable compression ratio mechanism. Consequently, the changes of the compression ratio are delayed relative to the accelerator pedal operation in the low vehicle speed/high speed reduction ratio state. This results in a large change of driving force at driver's unintended timing whereby it becomes very difficult to perform fine adjustment of the vehicle speed.

In the comparative example, the compression ratio is increased to "14" at the instant immediately before time t1 so that decrease of the compression ratio is delayed when the acceleration is started at time t1 as compared to the characteristics of the present embodiment indicated by the solid line in the figure. More specifically, whereas the compression ratio is decreased to the minimum compression ratio value of "8" at time t2 in the present embodiment as indicated by the solid line, the compression ratio is decreased to the minimum compression ratio value of "8" at delayed time t2' in the comparative example as indicated by the dotted line. This results in a longer continuation of the state where the compression ratio is high relative to the load whereby the fuel efficiency becomes deteriorated, or the actual torque of the internal combustion engine 1 becomes smaller than the driver's intention, due to the execution of forcible ignition timing retardation for prevention of knocking.

Figure 8:
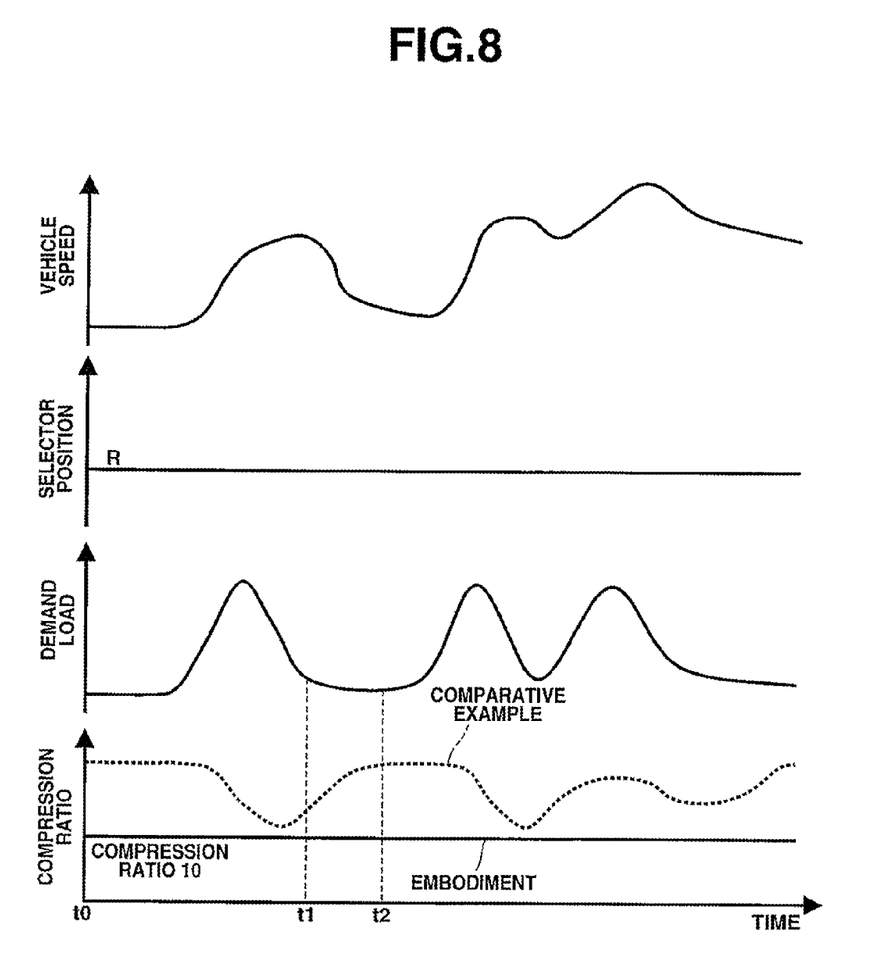
FIG. 8 is a timing chart showing changes in operating conditions according to the one embodiment of the present invention during reverse driving at the selection of the reverse drive position.

It is possible in the present embodiment to suppress the above problems of the comparative example, such as deterioration in drivability in the low vehicle speed region and delay in decrease of the compression ratio during acceleration FIG. 8 is a timing chart showing changes of the operating conditions during reverse driving of the vehicle upon shifting of the automatic transmission 4 to the reverse drive position. In particular, the figure assumes reverse driving in a very low vehicle speed state, such as parking. In the figure, each wave of the demand load graph corresponds to driver's slight depression and immediate release operation of the accelerator pedal. In the present embodiment, the compression ratio is controlled with reference to the reverse-drive compression ratio map of FIG. 6. Since the demand load tT is changed up and down on a relatively low load side, the vehicle is driven with the compression ratio being maintained at "10". Thus, there does not occur a driver's unintended torque change due to changes of the compression ratio whereby it is easy to perform fine adjustment of the vehicle speed in the very low engine speed state e.g. during parking.

The dotted line in the figure indicates, as a comparative example, a change of the compression ratio in the case of using e.g. the second compression ratio map of FIG. 6 even at the selection of the reverse drive position. In this case, the compression ratio is changed according to the demand load tT (i.e. the amount of depression of the accelerator pedal) with an unavoidable response delay. For example, the accelerator pedal is released back to its pedal position by the driver at time t1. However, increase of the actual compression ratio is delayed so that the actual compression ratio is increased from time t1 to time t2. This results in a smaller decrease of the actual driving force than the driver's intention whereby it becomes very difficult to perform fine adjustment of the vehicle speed.

Although the present invention has been described with reference to the above exemplary embodiment, the present invention is not limited to the above exemplary embodiment. Various changes and modifications of the above exemplary embodiment are possible.

In the above embodiment, the variable compression ratio mechanism is of the type using the multi-link type piston-crank mechanism. In the present invention, however, the variable compression ratio mechanism is not limited to such type. The present invention can be applied to internal combustion engines with various types of variable compression ratio mechanisms.

In the above embodiment, one reverse-drive compression ratio map is used when the reverse drive position is selected. Alternatively, a plurality of reverse-drive compression ratio maps may be used as in the case of forward driving. Further, it is alternatively feasible to use the reverse-drive compression ratio map of FIG. 6 when the speed reduction ratio is high at the selection of the reverse drive position and to use either the first compression ratio map of FIG. 4 or the second compression ratio map of FIG. 5 when the speed reduction ratio is low even at the selection of the reverse drive position.

Furthermore, the actuator 2 of the variable compression ratio mechanism is controlled by feedback control based on a difference between the target compression ratio tCR and the actual compression ratio detected by any sensor. A control gain of the feedback control can be varied according to the actual speed reduction ratio RR such that a change speed of the compression ratio is decreased as the actual speed reduction ratio RR is higher. In this case, it is possible to suppress a torque change occurring due to sensitive changes of the compression ratio e.g. when the vehicle speed is low and the actual speed reduction ratio RR is high.

The invention claimed is:

1. A control device for controlling an internal combustion engine for a vehicle, the internal combustion engine having a variable compression ratio mechanism to change a mechanical compression ratio, the vehicle having a transmission mechanism disposed between the internal combustion engine and driving wheels to change a speed reduction ratio, the control device being adapted to set the mechanical compression ratio based on engine operating conditions,
wherein the control device limits a control range of the mechanical compression ratio to a narrower range as the speed reduction ratio is higher.

2. The control device for controlling the internal combustion engine for the vehicle according to claim 1, wherein the control device sets an upper limit of the control range of the mechanical compression ratio to a lower value as the speed reduction ratio is higher.

3. The control device for controlling the internal combustion engine for the vehicle according to claim 1, wherein the control device decreases a change speed of the mechanical compression ratio as the speed reduction ratio is higher.

4. The control device for controlling the internal combustion engine for the vehicle according to claim 1, wherein the control device limits the control range of the mechanical compression ratio such that, at the same speed reduction ratio, the control range of the mechanical compression ratio is narrower during reverse driving than during forward driving.

5. A control method for controlling an internal combustion engine for a vehicle, the internal combustion engine having a variable compression ratio mechanism to change a mechanical compression ratio, the vehicle having a transmission mechanism disposed between the internal combustion engine and driving wheels to change a speed reduction ratio, the control method comprising:
setting the mechanical compression ratio based on engine operating conditions; and
limiting a control range of the mechanical compression ratio to a narrower range as the speed reduction ratio is higher.

* * * * *